Oct. 23, 1962                J. B. THOMPSON ET AL                3,059,948
                                BALL AND SOCKET JOINT
                                 Filed March 17, 1959
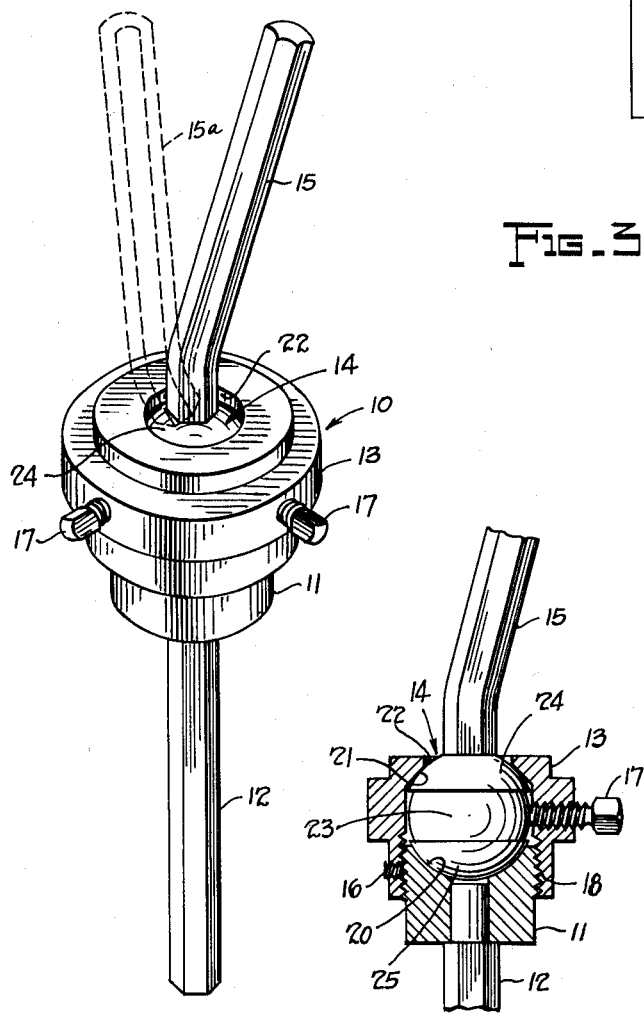
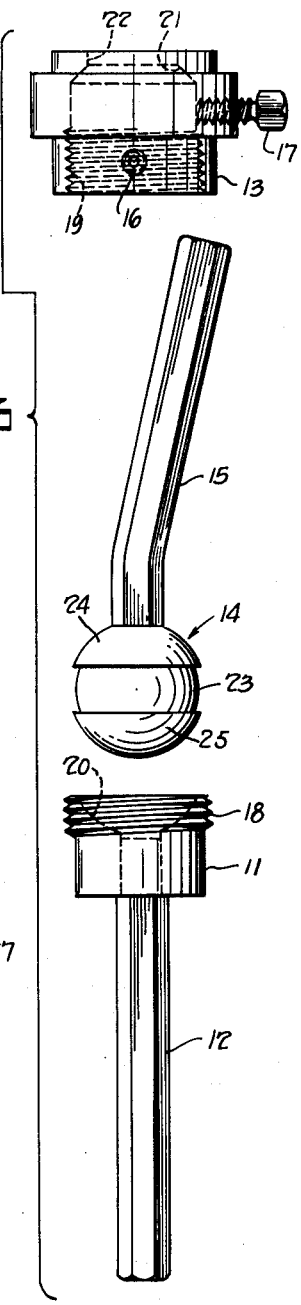
INVENTORS
JOSEPHUS B. THOMPSON
BY JOSEPH E. WHITENACK
Sanford Schnurmacher
ATTORNEY.

United States Patent Office
3,059,948
Patented Oct. 23, 1962

3,059,948
BALL AND SOCKET JOINT
Josephus B. Thompson, Covington, and Joseph E. Whitenack, New Carlisle, Ohio, assignors to Joseph Rogers, Inc., Cleveland, Ohio
Filed Mar. 17, 1959, Ser. No. 799,989
2 Claims. (Cl. 287—12)

This invention relates to swivel supports and particularly to a ball and socket support for drum accessories.

Conducive to a better understanding of this invention it may be well to point out that the drummer of a band usually employs several accessory devices which are played in connection with the drums, to provide distinctive beats and sound effects other than that provided by the drums themselves, in order to lend sparkle and novelty to the over-all musical performance.

Such accessory devices must of necessity be located within easy reach of the drum so that the drummer may alternate between the drum and the accessory with facility and without lost motion. Furthermore, such accessories must be positioned at odd angles with reference to the drum head in order to be in position to be struck or stroked without interruption of the musical beat, as the drummer alternates between the drum and the accessory device.

The primary object of this invention, therefore, is to provide a support for drum accessories that may be easily swiveled or tilted between adjusted positions and securely locked in such adjusted positions.

Another object is to provide such a device that embodies a ball and socket joint having positive locking screws engageable with the face of the ball so that the ball may be locked in adjusted positions against movement under the impact and vibration incident to the playing of the supporting drum and attached accessory.

A further object is to provide a device of the type stated whose ball element has an equatorial recess for engagement by the locking screws, so that the bearing surface of the ball will remain free of pits or ridges, thus assuring smooth swivelling action even after long and hard usage and repeated adjustments.

Still other objects are to provide a device of the type described that is easy to adjust, positive in its locking action, compact in structure and pleasing in appearance.

These, and other objects of the invention will become apparent from a reading of the following specification and claims, together with the accompanying drawing, wherein like parts are referred to and indicated by like reference characters, and wherein:

FIGURE 1 is a perspective view of the ball and socket support for drum accessories, that is the subject of this invention, showing the accessory supporting post in alternate positions;

FIGURE 2 is a partial vertical sectional view of the same taken through the ball and socket joint; and FIGURE 3 is an exploded view of the device.

Referring more particularly to the drawing, there is seen in FIGURE 1 the ball and socket drum accessory support, that is the subject of this invention, broadly indicated by reference numeral 10.

The device comprises a cylindrical base member 11 having a dependent post 12 adapted to be clamped, or otherwise secured to a drum or other support, not shown.

The base 11 has an external thread 18 and a concave, substantially semi-spherical, bearing surface 20 adapted to receive the ball 14 therein.

Reference numeral 13 indicates a ball socket or cage, having internal threads 19, adapted to be mounted on the base 11 in engagement with the threads 18, thereof.

The cage member 13 has an opening 22 in the top thereof bounded by an annular bearing surface 21 complemental to the base bearing surface 20.

The cage 13 is held in locked engagement with the base by set screw 16.

Reference numeral 14 indicates a solid metal ball made of a metal softer than the hereinafter described lock screws 17, such as soft iron or steel.

The ball 14 has an equatorial recess 23, of substantial width, bounded by an upper bearing surface 24 and a lower bearing surface 25, as is seen most clearly in FIGURE 3.

An accessory mounting post 15 is mounted at the pole of the ball perpendicular to the recess 23.

The post 15 is bent at a slight angle near its point of junction with the ball 14 in order to provide additional angular disposition of the supported drum accessory, not illustrated, with reference to the base support post 12.

The ball 14 is nested within the cage 13, as seen in FIGURES 1 and 2, with the accessory post 15 extended through the cage opening 22.

The so nested ball 14 is free to rotate within the cage 13 with its lower bearing surface 25 riding on the base bearing surface 20 and its upper bearing surface 24 riding against the cage bearing surface 21.

The attached accessory supporting post 15 is simultaneously free to tilt and rotate in all directions, limited only by the edge of the cage opening 22, as indicated by reference numeral 15a.

The attached accessory supporting post 15 is simultaneously free to tilt and rotate in all directions, limited only by bounding edge of the cage opening 22, as seen in FIGURE 1. Reference numeral 15a indicates the position of maximum tilt of post 15.

The width of the slot 23 is such that the point ends of the screws 17 never engage the bearing surfaces 24 and 25 of the ball, in all possible tilted positions of the post 15.

Accordingly, the dimensional difference between the diameters of the cage member opening and the ball post is less than the dimensional difference between the width of the ball recess and the diameter of the point end of the set screw.

The two screws 17 are positioned 90° apart and act to push the ball 14 against the side of the cage opposite them, which re-acts as a third contact point, so that a third screw is not needed.

The post 15, upon which a drum accessory, not illustrated, is supported may be swiveled and tilted to bring the playing surface of the accessory to the desired angle, and then the lock screws 17 are tightened against the ball surface at the recess 23.

The ball 14, being made of softer metal than the lock screws 17, can be penetrated by the hardened points of the screws, thereby assuring retention of the ball at the desired position under the most severe condition of vibration and shock.

If the screws 17 merely contacted the surface through pressure alone, the ball 14 would eventually slip under the repeated blows directed against its supported instrument by the drummer, causing it to lose its adjustment.

The only certain locking means requires penetration of the ball surface, as well as pressure.

Such penetration results in pitting and burring of the ball surface by the hardened screws 17.

Normally, this would interfere with the smooth rotation of the ball 14, thus making critical adjustment difficult if not impossible.

However, due to the fact that all contact between the ball 14 and the hardened screws 17 is confined to the equatorial recess 23, which is depressed below the bearing surfaces 24 and 25, such pitting does not affect the smooth rotation of the ball against the bearing surfaces 20 and 22 of the base and cage, respectively. Thus the deforming effect, due to the penetration of the screw points incident to frequent re-adjustment is not a problem with this device, since the burred recess surface 23 is always below the bearing surfaces 24 and 25 upon which the ball 14 rotates.

It will now be clear that there has been provided a device which accomplishes the objectives heretofore set forth.

While the invention has been disclosed in its preferred form, it is to be understood that the specific embodiment thereof as described and illustrated herein, is not to be considered in a limited sense, as there may be other forms or modifications of the invention which should also be constructed to come within the scope of the appended claims.

We claim:

1. A ball and socket joint, comprising in combination, a base member having a semi-spherical bearing surface, open to the top, and a depending mounting post; a cage member mounted on the base, having an opening in the top thereof bounded by an annular bearing surface complemental to the base bearing surface; a solid ball, having an annular equatorial recess cut therein, nested within the cage between the bearing surfaces; an upstanding post mounted on the ball at its polar axis and tiltable therewith relative to the bounding edge of the cage opening and the vertical axis of the mounting post; and a plurality of lock screws mounted on the cage and engageable at their point ends with the ball recess, to lock the ball post in adjusted positions; the dimensional difference between the diameters of the cage member opening and the ball post being less than the dimensional difference between the width of the ball recess and the diameter of the point end of the set screws, said ball post being bent at an angle to the polar axis of the ball.

2. A ball and socket joint, comprising in combination, a base member having a semi-spherical bearing surface, open to the top, and a depending mounting post; a cage member mounted on the base, having an opening in the top thereof bounded by an annular bearing surface complemental to the base bearing surface; a solid ball, having an annular equatorial recess cut therein, nested within the cage between the bearing surfaces; an upstanding post mounted on the ball at its polar axis and tiltable therewith relative to the bounding edge of the gage opening and the vertical axis of the base mounting post; and a plurality of lock screws mounted on the cage and engageable at their point ends with the ball recess, to lock the ball post in adjusted positions, the dimensional difference between the diameters of the cage member opening and the ball post being less than the dimensional difference between the width of the ball recess and the diameter of the point end of the set screws.

References Cited in the file of this patent

UNITED STATES PATENTS

| | | |
|---|---|---|
| 230,521 | Barker | July 27, 1880 |
| 419,137 | Bobemerith | Jan. 7, 1890 |
| 1,539,277 | Schenck | May 26, 1925 |
| 2,553,337 | Shafer | May 15, 1951 |
| 2,776,168 | Schweda | Jan. 1, 1957 |

FOREIGN PATENTS

| | | |
|---|---|---|
| 181 | Great Britain | Jan. 5, 1892 |